United States Patent

[11] 3,608,056

[72] Inventor Dorsey C. Nelson
         Springfield, Pa.
[21] Appl. No. 795,125
[22] Filed Jan. 29, 1969
[45] Patented Sept. 21, 1971
[73] Assignee FMC Corporation
         Philadelphia, Pa.

[54] STEAM RETICULATION OF FOAMED PLASTIC SHEETING
10 Claims, 3 Drawing Figs.

[52] U.S. Cl. ................................................ 264/321,
         18/1 FB, 18/1 FZ, 260/2.5 AX, 264/54, 264/289,
         264/340, 264/DIG. 16, 264/DIG. 73
[51] Int. Cl. ...................................................... B29d 7/22,
         B29d 7/24, B29d 27/00
[50] Field of Search .......................................... 264/321,
         51, 54, 289, 340, DIG. 73, DIG. 16, 18/1 FS,
         1 FZ; 260/2.5 AX

[56] References Cited
UNITED STATES PATENTS

| | | | |
|---|---|---|---|
| 3,061,885 | 11/1962 | Rogers et al. | 264/321 UX |
| 3,171,820 | 3/1965 | Volz | 264/321 X |
| 3,239,585 | 3/1966 | Karpovich et al. | 264/321 X |
| 3,300,558 | 1/1967 | Grant et al. | 264/321 |
| 3,475,525 | 10/1969 | Peters | 264/321 X |

*Primary Examiner*—Philip E. Anderson
*Attorneys*—Thomas R. O'Malley, George F. Mueller and Eugene G. Horsky

ABSTRACT: Reticulation of foamed or cellular materials by applying water onto such material, converting the water to steam and confining the steam to passage through the material whereby membranous portions of the material are ruptured under the pressure created as the water expands during its conversion into steam.

PATENTED SEP 21 1971  3,608,056

HEAT-STRETCH

STEAM RETICULATION OF FOAMED PLASTIC SHEETING

The present invention is directed to a method of making reticulated structures from foamed or cellular materials.

In a conventional method of making thermoplastic polymeric cellular or foamed materials, as for example polypropylene foams, a solid chemical blowing agent, such as axodicarbonamide, is applied as a powder or dust onto the surfaces of pellets of the thermoplastic resin which have been pretreated as with mineral oil. This mixture of resin and solid chemical blowing agents is then charged into an extruder, heated to a molten condition while being mixed under pressure, and then extruded into a zone of lower pressure, such as the ambient room atmosphere. The blowing agents decompose when heated and thus generate gases which serve to expand or foam the molten resin as it issues into the zone of lower pressure. The extruded foamed material is then cooled, as within a quench bath or by contact with a chilled roller.

The cellular or foamed material formed by the above-described method consists of contacting cells which together provide a skeletal structure formed of a network of interconnected strands and membranes or windows joined to the skeletal structure and partitioning contiguous cells. Some of the cells of such foamed material may be completely closed from contiguous cells by the membranes or windows, while other cells may be completely open or partitioned by the membranes or windows from only some of the cells which are contiguous thereto.

Foams formed of thermosetting materials exhibit a cell structure which is generally similar to that described above.

It has been recognized that with foams formed of either thermosetting or thermoplastic polymeric materials the removal of cell membranes or windows provides a cellular or foamed structure which is not only more permeable but softer and more flexible and thus better suited for use, for example as filters, nonwoven fabrics, etc. The prior art teaches many methods for effecting removal of membranes from cellular or foamed material. For example, a U.S. Pat. to Volz, No. 3,171,820, describes a number of such methods for use with polyurethane foam, as by subjecting the foam to the hydrolytic action of water, with or without the presence of a hydrolysis catalyst, or by passing a high temperature flame front, generated by an expanding gas mixture, through a membrane-bearing polyurethane foam.

U.S. Pat. No. 3,175,025 to Geen discloses that igniting a combustible mixture of an oxidizer material and an oxidizable material within a polyurethane foam material will achieve removal of membranes therefrom.

Another U.S. Pat. to Geen, No. 3,175,030, teaches that cell membranes may be removed from polyurethane foams by subjecting such foams to a light pulse of sufficient intensity or energy.

A U.S. Pat. to Grant et al. No. 3,300,558, discloses that a polyurethane foam may be dry crushed, between rolls to rupture cell membranes, after which the cells are filled with water and the foam subjected to squeezing or crushing to remove cell membranes.

Objections to the methods disclosed in the prior art for removing cell membranes from cellular or foamed materials are varied. Many of such methods are efficient, yet may be uneconomical, slow, involve obnoxious odors, vapors or fumes, or so difficult to control as to cause thinning and/or degradation of the network of interconnected strands which remains after cell membranes have been removed. Other of such known methods do not provide for uniform results or simply do not effect sufficient removal or rupture of cell membranes as to appreciably alter the character of the cellular or foamed materials. Accordingly, a primary object of this invention is the provision of a new or improved and more satisfactory method for producing reticulated foamed structures; that is, cellular structures in which a significant number of cell membranes or windows in such structures are at least ruptured.

Another object is to provide a method for reticulating cellular or foamed materials without any apparent thinning or degradation of the network of interconnected strands in such cellular or foamed materials.

Still another object is the provision of a method for providing reticulated cellular or foamed structures of thermosetting or thermoplastic materials which is efficient, rapid and economical.

A further object is to provide an improved method for reticulating continuous, advancing cellular or foamed materials.

A still further object is the provision of a method for reticulating cellular or foamed materials which requires no chemicals and is free of obnoxious odors, fumes and vapors.

Still further objects will appear in the following description of the invention.

The above and other objects are accomplished in accordance with the present invention by a method in which a cellular or foamed material, having membranes or windows which partition contiguous cells, is wet with water at least along one side or surface and then heated to a temperature of at least 212° F., with at least the one wet side but less than all sides of the cellular or foamed material being sealed against any substantial escape of moisture thereof during the heating of the cellular or foamed material. Under the temperature conditions noted, the water carried by the cellular material is changed into steam and during such conversion expands about 1,700 times and exerts pressure in all directions.

Important in the practice of the present invention is that the expanding water and steam is prevented from escaping from along all sides or surfaces thereof and therefore must pass through cellular material to reach an exposed surface from which it may issue. During this travel of the steam under pressure through the cellular material, cell membranes or windows in its path are effectively ruptured or reticulated and without any damage to the remaining cellular material.

Desirably, the cellular material is wet by merely being submerged within a water bath or perhaps by sprays of water. Wetting agents may be contained within the applied water to assure its retention by the cellular material. Actually most of the applied water will be carried on and/or near its exposed sides or surfaces since the relatively small cells of the cellular material and the presence of cell membranes or windows inhibit any significant penetration thereof. The application of water under pressure or other procedures for achieving deep penetration of water into the cellular material are neither necessary nor desired. Water impregnated deep into the cellular material involves some sacrifice in economy and perhaps in the speed of operations and, more important, may require such high temperature for its conversion into steam that the exposed surfaces of the cellular material will be damaged.

Any wetting agent which does not alter the physical or chemical properties of the cellular material may be employed during the wetting thereof. Common household detergents have been found to be effective for improving the water retention properties of polypropylene foams.

The wet cellular material may be heated in any convenient manner, as by infrared lamps, ovens, heated moving rolls or belts, etc. Sealing or preventing the escape of steam from at least one wet side of the cellular or foamed material during the heating thereof may be achieved in a variety of ways, as for example by engaging such one side tightly against an impermeable surface. Desirably, the heating and sealing of the one wet side of the cellular material is achieved with the same means. For example, heated, rotatable metallic rolls will effectively heat and seal successive portions of one or both sides of a cellular material in continuous web or sheet form concomitantly with its advancement relative to such rolls. Such continuous web of cellular material may be tensioned longitudinally to the extent necessary to insure its snug contact with the roll surfaces notwithstanding the pressures which are exerted by the expanding water during its conversion into steam.

The wet cellular material must be heated to at least 212° F. to convert the water contained therein into steam. While only the one or more wet sides thereof which are sealed against the escape of moisture need be heated it is preferred that the entire cellular material be heated to avoid cooling of the steam during its passages therethrough. The higher the temperature employed, the more rapid is the conversion and generally the more efficient is the rupture or reticulation of the cell membranes in the cellular materials. The maximum temperatures employed will, of course, depend upon the particular cellular materials which are being treated. Following the reticulation method of the present invention, the cellular material may be cooled by the ambient atmosphere and collected.

The method of the present invention is adapted for use with either thermosetting materials, such as polyurethane foams, or thermoplastic materials, as for example polyesters, polypropylene, polyethylene, polyvinyl chloride, polystyrenes, etc. Neither the manner by which the cellular material is formed nor the cell size or displacement are critical for satisfactory practice of the method of the present invention.

The term "reticulation" is employed throughout the description and claims as meaning a rupture and/or partial or complete removal of cell membranes or windows of a cellular or foamed material. Generally, the cell membranes which are ruptured by the method of the present invention, if not completely removed, appear to shrivel up against the network of interconnected strands and thus no longer exist as membranes or windows in the reticulated structure.

The method of the present invention is particularly well adapted for reticulating cell membranes or windows in continuous, traveling web or sheet of thermoplastic polymeric cellular materials which may be formed in a conventional manner, as hereafter described. While not essential to the method of the present invention, such continuous foamed web is preferably stretched along one or both of its axial directions to effect molecular orientation and thus provide the web with greatly improved strength properties. While rupture of some cell membranes or windows in the foamed web may occur during the stretching thereof, the stretched web is still lacking in desired softness, flexibility and porosity.

Figure 1:
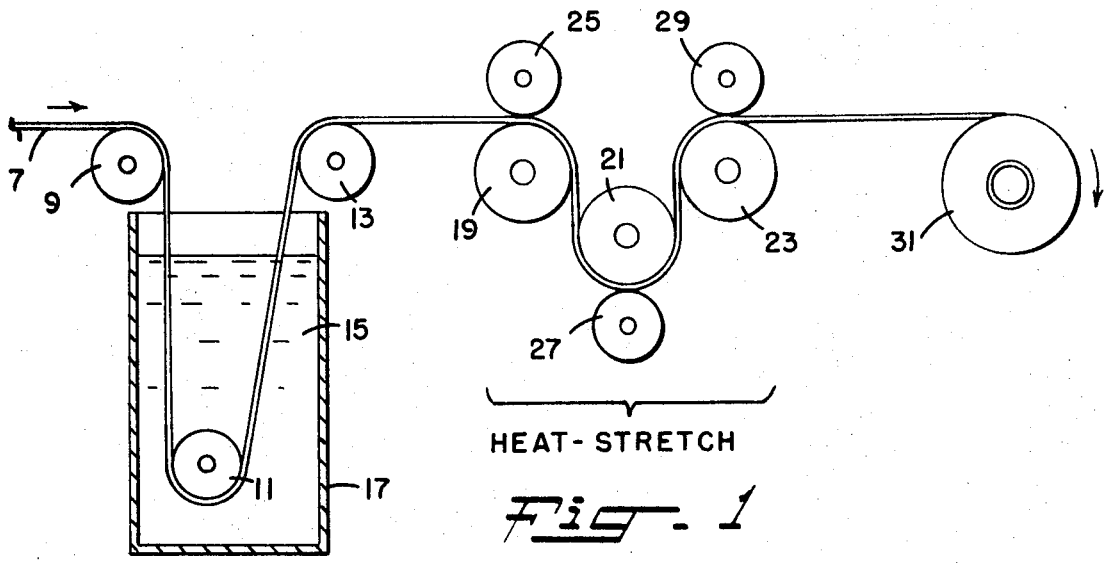
FIG. 1 is a diagrammatic illustration of apparatus which is suitable for use in the practice of the method of the present invention.

Referring to FIG. 1 of the drawing, a foamed and stretched web 7, as for example of polypropylene, is passed over a guide roller 9, laced about an immersion roller 11 and then onto another guide roller 13. During its passage about such rollers, the web 7 is wet with water 15 contained within a tank 17. Preferably, the water 15 contains a suitable wetting agent to insure the retention of water on and/or near the exposed web surfaces.

From the guide roller 13, the foamed and now wet polypropylene web 7 is laced over one or more driven, metal rolls, such as shown at 19, 21 and 23, which are internally heated to at least 212° F., and preferably to a temperature in the range of from 220° to 260° F. The rolls 19, 21 and 23 are all of conventional construction and are positively driven at constant speeds, but with each roll being turned at a slightly faster speed than an immediately preceding roll. In this manner, the foamed polypropylene web is longitudinally tensioned and thus pressed snugly against the peripheral surfaces of the rolls 19, 21 and 23.

Rollers 25, 27 and 29 cooperate with the heated rolls 19, 21 and 23, respectively, to nip the web 7 and thus prevent slippage of the web and confine the applied longitudinal tension to that portion of the web over the series of heated rollers.

As the one side of the foamed polypropylene web 7 engages and travels with the surface of the heated roll 19, the water contained on and near such side is converted into steam. Although this steam is under pressure, the longitudinal tension applied to the web 7 maintains the same, snugly against the surface of the roll 19. The steam therefore travels through the web and toward its exposed sides and, under the pressure it exerts during such passage, effects rupture of cell membranes or windows which are in its path. Similar results are provided as the web 7 engages and travels with the heated rolls 21 and 23. Upon leaving the roll 23, the now-reticulated web 7 is rapidly cooled by the ambient atmosphere and may be collected as a roll 31. The reticulated web 7 is completely dry as it leaves the roll 23 and is considerably softer and more flexible than the original stretched foamed web.

Figures 2, 3:
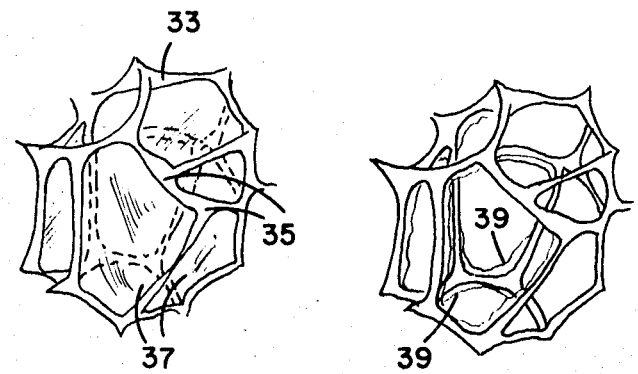
FIG. 2 is a fragmentary view, on an enlarged scale, of a single closed cell of a cellular material prior to reticulation of the same in accordance with the method of the present invention.
FIG. 3 is a view similar to FIG. 2 illustrating a cell of a cellular material after the reticulation thereof.

Referring now to FIGS. 2 and 3 of the drawing, the single closed cell of a cellular material shown in FIG. 2 includes a network of interconnected strands 33, which meet at junctions 35 and cell membranes or windows 37. It is the presence of these membranes which give the cellular structure its harsh and stiff characteristics and, of course, by partitioning and perhaps completely closing off cells, minimize its porosity.

FIG. 3 diagrammatically illustrates the same cell shown in FIG. 2 after it has been reticulated in accordance with the method of the present invention. As heretofore mentioned, the method of the present invention has no apparent effect upon the network of interconnected strands 33 and strand junctions 35 so that such network is substantially the same in both FIGS. 2 and 3. The reticulating method described does rupture the cell membranes 37. More particularly, the cell membranes 37 which were present in the cell shown in FIG. 2 have been either completely removed by the reticulating method or appear in part as shriveled portions 39 along some of the strands 33.

To more fully illustrate the merits of the method of the present invention, reference is made to the following example:

Pellets of polypropylene resin were surface treated with oil and then coated with a powdered blowing agent, consisting of azodicarbonamide, and zinc stearate which served as a blowing agent activator. The formulation of this foamable polypropylene composition in parts by weight was as follows:

| | |
|---|---|
| Polypropylene resin (Melt viscosity 5) | 100 parts |
| Textoline–100 oil | 0.1 part |
| Celogen AZ (azodicarbonamide) | 0.6 part |
| Zinc Stearate | 0.1 part |

This foamable polypropylene composition was charged into and continuously extruded from a conventional screw extruder having three electrically heated zones along the barrel thereof and a screw having a length-to-diameter ratio of 20 to 1. The extruder screw was formed with a long metering section and a shorter compression zone and served to force the molten polypropylene through a curved neck adapter and into a "no-land" flat film die, the latter of which served to prevent premature expansion of the gas-containing polymer melt. The lips of the extrusion die provided an opening 6 inches in length and were spaced about 3 mils from each other.

Temperature conditions during extrusion were as follows:

| | Temperature °F. |
|---|---|
| Rear Barrel | 370 |
| Center Barrel | 385 |
| Front Barrel | 400 |
| Adaptor | 410 |
| Die | 410 |

The elevated temperature at the extrusion die insured that the decomposition of the blowing agent was complete at or near the die orifice and facilitated regulation of the cell size in the extruded foam.

Upon issuing into the ambient room atmosphere the molten polypropylene expanded and was quenched in a cold water bath located about 1 inch below the extrusion nozzle.

The resulting foamed polypropylene web was essentially unoriented and of generally closed-cell construction. The polypropylene web was then heated to a temperature about its second order phase transition temperature and stretched, first in its machine direction between pairs of spaced nip rolls and then in a transverse direction using a tenter frame. The machine and transverse stretch ratio were 1.8 to 1 and 2.8 to 1, respectively. Stretching of the foamed web provided the same with good tear strength properties and caused rupture of some cell membranes. The web, however, still lacked the necessary softness and flexibility which would enable the same to be used in applications such as garments, drapes, upholstery covers, etc.

This stretched, continuous web of foamed polypropylene was then passed through a bath of water, which was substantially at room temperature. A household detergent was added to the water bath to facilitate water retention by the foamed web. Directly from the water bath the wet web of foamed polypropylene was laced over a series of three conventional rotating, metallic rolls and was nipped against the outermost of such rolls, as shown in FIG. 1 of the drawing.

All of these rolls were internally heated to a temperature of about 240° F. and were of a diameter of 20 inches. The arc of contact of the web with the respective rolls was as shown in FIG. 1 of the drawing and the rolls were positively driven at different rates of speed to tension the web longitudinally during its travel with such rolls. The first roll contacted by the web was driven at a speed of 14.0 feet per minute; the intermediate roll at a speed of 14.5 feet per minute; and the last roll of the series at a speed of 15.0 feet per minute.

During travel over the heated rolls, no escape of steam from between the traveling web and roll surfaces occurred. It was observed, however, that steam did issue from the exposed surfaces of those portions of the web which were not in contact with the roll surfaces, thus clearly showing that the steam generated at the roll surfaces passed completely through the foamed web.

After traveling about 20 feet beyond the last of the series of heated rolls, the web was found to be cool when touched by hand, completely dry and very soft and flexible.

I claim:
1. A method of reticulating a cellular polymeric material having a network of interconnected strands and cell membranes including the steps of applying water to at least one side of such cellular material, heating the wet side of the cellular polymeric material to a temperature of at least 212° F. to convert the water thereon into steam and concomitantly with heating preventing the escape of the steam from along at least the one heated side but less than all sides of the cellular polymeric material.

2. A method as defined in claim 1 wherein said cellular material is wet by passing the same through a bath of water containing a wetting agent.

3. A method as defined in claim 2 wherein said cellular material is a continuous web and wherein the continuous web of cellular material is wet and heated while being continuously advanced in a longitudinal direction.

4. A method as defined in claim 3 wherein said continuous web of cellular material is heated while engaged with a moving member having an impervious surface.

5. A method as defined in claim 4 wherein the moving member is a roller and further including the step of longitudinally tensioning the continuous web to snugly engage the same with the moving member and thereby prevent the escape of steam under from between such web and moving member.

6. A method as defined in claim 2 wherein said cellular material is a thermosetting polymeric material.

7. A method as defined in claim 2 wherein said cellular material is a thermoplastic polymeric material.

8. A method as defined in claim 7 wherein said thermoplastic material is polypropylene.

9. A method as defined in claim 8 wherein said cellular material of polypropylene is heated to a temperature of from 220° to 260° F. after the wetting thereof.

10. A method as defined in claim 9 wherein said cellular material of polypropylene is a continuous web, said web being wet and heated while being continuously advanced in a longitudinal direction, and wherein the continuous web of cellular material is heated by engagement with the peripheral surface of at least one rotatable heated roller having an impervious surface, and wherein the escape of steam from along the heated side of the web is prevented by maintaining the web longitudinally tensioned and snugly engaged with the roller surface.

PO-1050
(5/69)

UNITED STATES PATENT OFFICE
CERTIFICATE OF CORRECTION

Patent No. 3,608,056        Dated September 21, 1971

Inventor(s) Dorsey C. Nelson

It is certified that error appears in the above-identified patent and that said Letters Patent are hereby corrected as shown below:

Column 1, line 7, "axodicarbona-" should read
-- azodicarbona- --. Column 5, line 3, "about" should read
-- above --.

Signed and sealed this 14th day of March 1972.

(SEAL)
Attest:

EDWARD M. FLETCHER, JR.        ROBERT GOTTSCHALK
Attesting Officer        Commissioner of Patents